(12) United States Patent
Vu et al.

(10) Patent No.: US 9,264,216 B1
(45) Date of Patent: Feb. 16, 2016

(54) METHOD FOR REDUCING POWER CONSUMPTION WHEN ESTIMATING TIMING ERRORS IN WIRELESS SIGNALS

(71) Applicant: Nitero Pty Ltd., Fitzroy, Victoria (AU)

(72) Inventors: Ngoc Vinh Vu, Austin, TX (US); Antonio Torrini, Austin, TX (US)

(73) Assignee: NITERO PTY LTD., Fitzroy (AU)

( * ) Notice: Subject to any disclaimer, the term of this patent is extended or adjusted under 35 U.S.C. 154(b) by 0 days.

(21) Appl. No.: 14/665,915

(22) Filed: Mar. 23, 2015

(51) Int. Cl.
 H04W 4/00 (2009.01)
 H04L 7/00 (2006.01)
 H04J 3/06 (2006.01)
 H04L 1/20 (2006.01)
 H04L 1/00 (2006.01)

(52) U.S. Cl.
 CPC ............. *H04L 7/0087* (2013.01); *H04J 3/0602* (2013.01); *H04J 3/0697* (2013.01); *H04L 1/0091* (2013.01); *H04L 1/20* (2013.01); *H04L 7/0016* (2013.01); *H04L 7/0054* (2013.01)

(58) Field of Classification Search
 CPC ........... H04L 2025/03414; H04L 2025/03522; H04L 25/03159; H04L 27/2657; H04L 27/2662; H04L 27/266; H04L 27/2675
 See application file for complete search history.

(56) References Cited

U.S. PATENT DOCUMENTS

| | | | |
|---|---|---|---|
| 2004/0001563 A1* | 1/2004 | Scarpa | H04L 27/2675 375/326 |
| 2005/0058193 A1* | 3/2005 | Saed | H04L 25/03159 375/232 |
| 2015/0172086 A1* | 6/2015 | Khoshgard | H04L 27/2646 375/260 |

* cited by examiner

*Primary Examiner* — David Oveissi
(74) *Attorney, Agent, or Firm* — Hickman Palermo Becker Bingham LLP (57) ABSTRACT

A method and apparatus for low power timing recovery is provided. In an embodiment, different gains are used to estimate timing errors during different portions of the data packet. In an embodiment, timing errors are only estimated during known sequences of a data packet. In further embodiments, errors are initially estimated independently in a first portion of the data packet in order to determine a phase shift between the errors. In the second portion of the data packet, the total error is derived from one estimated error and the phase shift between the errors.

8 Claims, 7 Drawing Sheets

METHOD FOR REDUCING POWER CONSUMPTION WHEN ESTIMATING TIMING ERRORS IN WIRELESS SIGNALS

FIELD OF THE DISCLOSURE

The present disclosure relates to reducing power consumption in telecommunications when estimating and correcting for timing errors.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In wireless communications, a transmitter converts information into a signal and transmits that signal to a receiver. Often, both the transmitter and the receiver have their own phase-locked loop (PLL). A PLL is a system that allows a device to adjust a signal. For both the transmitter and the receiver, the PLL acts as a source of a clock which standardizes the timing within the waves. The PLL of the receiver is further used to adjust the received signal in certain situations. Wireless standards are used to define data included in wireless signals, modulation schemes, and actions that may be taken by PLLs of the transmitter or receiver. The PLL of the receiver adjusts received signals based on the shared wireless standard between the transmitter and the receiver.

Even assuming a perfect radio frequency transmission, the signal picked up by the receiver will not perfectly match the signal sent from the transmitter. This occurs because of unknown errors which exist between the clocks of the transmitter and the receiver. The unknown errors are defined as the carrier frequency offset (CFO) and the sampling frequency offset (SFO) and may be estimated independently.

To ensure high quality transmission, wireless standards have different ways of revealing the transmitter clock to the receiver. One method is by using known sequences in a data packet. A known sequence is a sequence of data that is defined by the specification of the wireless standard as taking place at a certain point in the transmission of the signal and containing defined data that is known to both the transmitter and the receiver. For example, in the standard for wireless transmissions at 60 GHz-IEEE 802.11ad (802.11ad), a preamble of a data packet includes two known sequences: the short training field (STF) and the channel estimation field (CEF). These two sequences use Golay fields, a particular binary phase-shifting key sequence. A binary phase-shifting key sequence uses phases with a unique pattern of binary digits which form symbols. Functionally, the two sequences contain a series of predefined symbols in a predefined order.

Recovering the clock errors and adjusting the signal accordingly is done using feedback loops. Feedback loops generally run during the entirety of a data packet, continuously sampling the received signal and making modifications to the received signal. Two feedback loops generally run on a receiver during the transmission of a data packet to estimate and correct for errors between the two clocks: one to estimate and correct for the CFO and one to estimate and correct for the SFO.

Because each data packet contains known sequences, the known sequences may be used to determine the CFO and SFO. In 802.11ad, the known sequences in the preamble of the data packet can be used to estimate the CFO and the SFO. The PLLs may estimate the CFO and SFO by determining the difference between the received preamble and the known parameters for the preamble. For example, with binary phase-shifting keys, such as the ones used in the STF and CEF of 802.11ad, the CFO may be estimated by determining the rotation of the symbols from the known STF and CEF to the received STF and CEF. Meanwhile, the SFO may be estimated by determining a delay in receipt of symbols from the known STF and CEF to the received STF and CEF. While the two offsets are mathematically related, the relationship between the two contains a different unknown phase shift for each transmission.

Running both the CFO feedback loop and the SFO feedback loop during the entirety of the data packet consumes a large amount of power. Less power can be used by lowering the gain of the system, but doing so decreases the precision with which the receiver can adjust the signal to match the signal sent by the transmitter.

What are needed are techniques for accurately estimating and correcting timing errors using techniques that utilize lower levels of power.

SUMMARY

The appended claims may serve as a summary of the disclosure.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure.

General Overview

Techniques are provided for reducing power consumption when estimating errors in a data packet. In an embodiment, initial error estimates take place at a high initial gain and the remaining estimates take place at a lower gain. In some embodiments, errors are only estimated during unique words of a data packet. In some embodiments, errors are initially estimated independently so that the phase shift between the two errors may be determined. In the remainder of the data packet, one error is estimated while the other error is derived off the first error.

Figure 1:
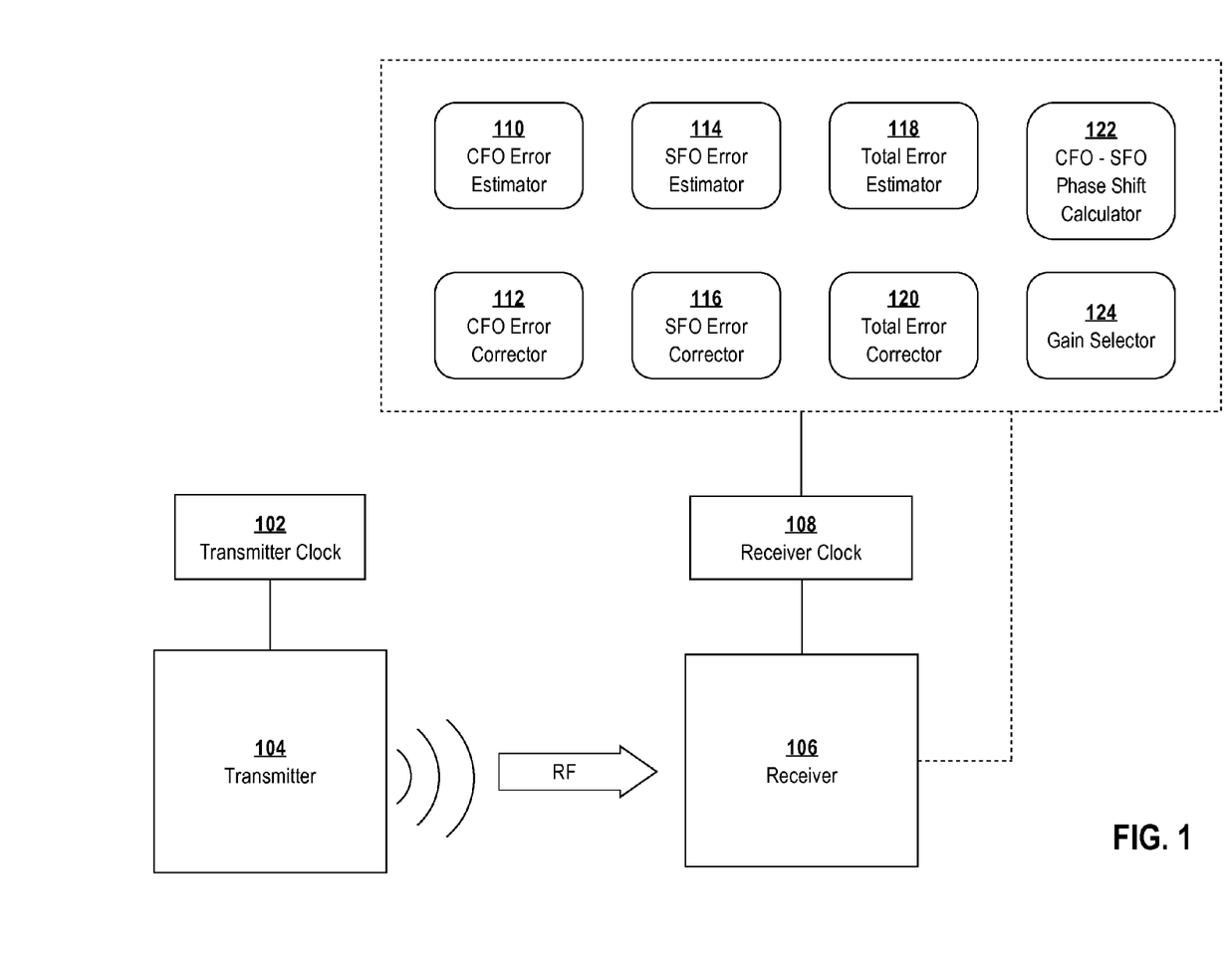
FIG. 1 is a block diagram depicting an example transmitter and receiver.

FIG. 1 is a block diagram of an example transmitter and receiver according to an embodiment. Transmitter 102 contains transmitter clock 104. In an embodiment, the source of the transmitter clock 104 is a phase-locked loop running on a crystal oscillator. Receiver 106 contains receiver clock 108. In an embodiment, the source of receiver clock 108 is a phase-locked loop running on a crystal oscillator. Receiver clock 108 contains two feedback loops, a carrier frequency offset (CFO) feedback loop and a sampling frequency offset (SFO) feedback loop which are used to estimate and correct for errors. Functionally, receiver clock 108 contains CFO error estimator 110, CFO error corrector 112, SFO error estimator 114, SFO error corrector 116, total error estimator 118, total error corrector 120, CFO-FSO phase shift calculator 122, and gain selector 124.

The feedback loops running on receiver clock 108 measure and correct for errors within the receiver clock. The CFO feedback loop estimates errors during the receipt of a data packet based on the carrier frequency offset and makes corrections to the signal based on the estimated errors. Similarly, the SFO feedback loop estimates errors during the receipt of the data packet based on the sampling frequency offset and makes corrections to the signal based on the estimated errors.

The feedback loops initially receive a data packet with one or more known sequences. CFO error estimator 110 and SFO error estimator 114 estimate errors by determining the difference between the data as received in the known sequences of the data packet and the data as expected from the known sequences in the data packet. While this determination is easier for the known sequences of a data packet, such a determination may also be made during the remainder of the data packet.

CFO error estimator 110 estimates the error caused by the CFO by determining a phase shift between the symbols received and the symbols expected. As a functional example, if the known sequence in the data packet included a square symbol and the received data packet included a diamond symbol where the square should have been, CFO error estimator 110 would determine that a phase shift exists which rotates the symbols 45 degrees. CFO error corrector 112 would then correct the remainder of the data packet by rotating all of the symbols back 45 degrees.

SFO error estimator 114 estimates the error caused by the SFO by determining a delay in the receipt of expected data. As a functional example, if the known sequence in the data packet spaces two symbols apart by 9 nanoseconds, and the received packet contains those symbols spaced apart by 11 nanoseconds, SFO error estimator may determine that an error exists which causes a two nanosecond delay. SFO error corrector would then correct the remainder of the packet by increasing the speed with which the signal plays back. Additional timing recovery methods include the Mueller-Muller algorithm in the symbol domain, the Gardner algorithm in a 2× oversample domain, and an early-late correlator gate in any arbitrary timing domain.

The functional examples discussed above exist merely to facilitate understanding and do not in any way limit embodiments discussed in the specification. Additionally, for purposes of readability, different modules such as CFO error estimator 110 and CFO error corrector 112, are depicted as separate components within the receiver clock. In various embodiments, the different modules may comprise multiple feedback loops containing different combinations of the modules depicted. In addition, the modules depicted may be implemented separate from receiver clock 108 and communicatively coupled to receiver 106. In other embodiments, various modules exist within the same component. For example, in an embodiment total error corrector 120 is the same module as CFO error corrector 110.

Different Power Levels

In an embodiment, gain selector 124 switches between different gains during each transmission to reduce the power used by the system. Gains refer to a system's ability to increase the power supplied to another system from a singular power source. If a system uses a high gain, it will consume a larger amount of power than if it uses a low gain. Additionally, a system consumes a larger amount of power by running operations continuously instead of having the operations be duty cycled. Gain selector 124 is configured to switch between gains in order to either increase or decrease the power consumed by receiver 106.

Figure 2:
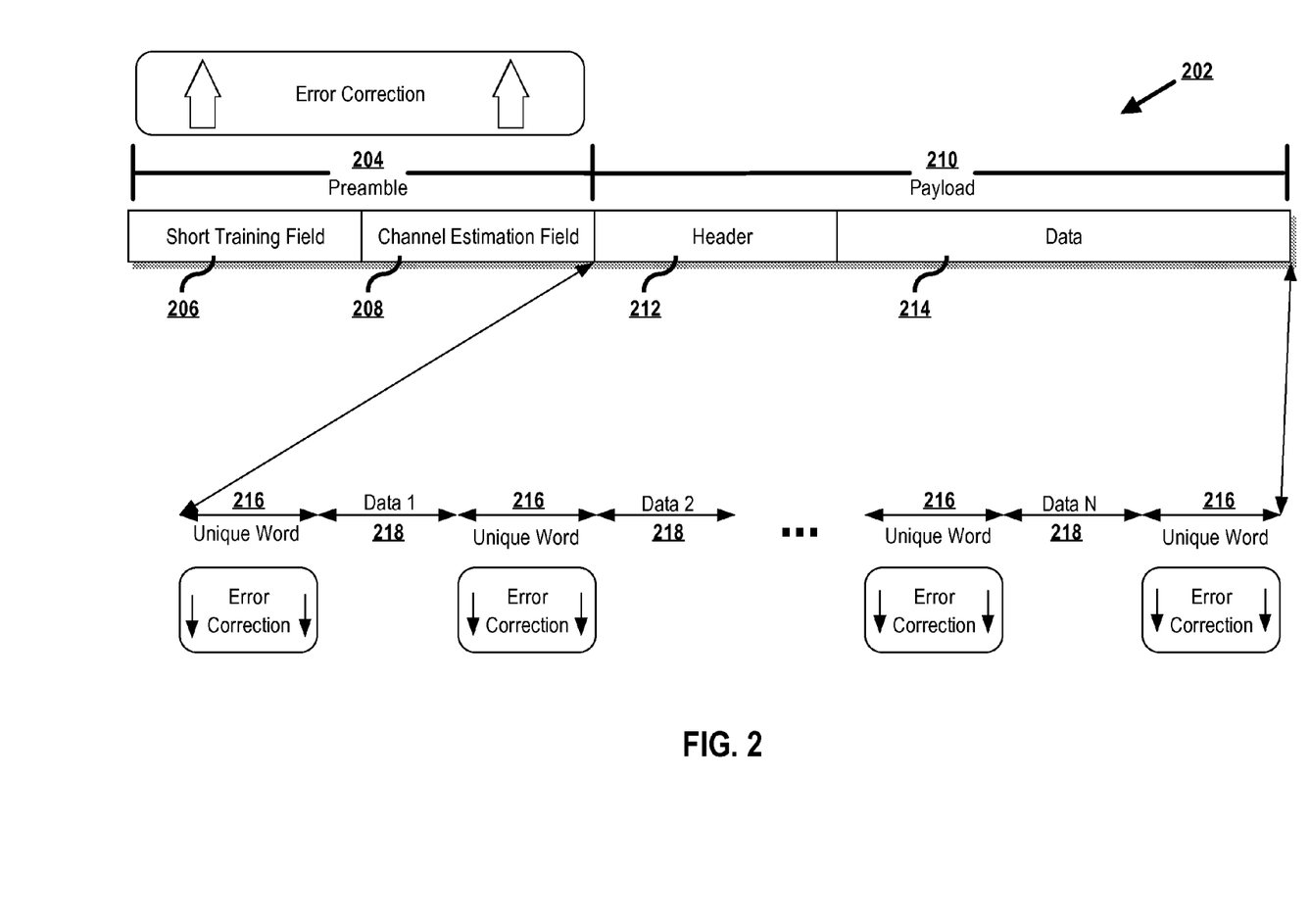
FIG. 2 depicts a sample system for estimating and correcting errors at different power levels in a sample data packet.

FIG. 2 depicts a sample system for estimating and correcting errors at different power levels in a sample data packet. Sample data packet 202 contains preamble 204 and payload 210. Preamble 204 contains short training field 206 and channel estimation field 208. Short training field 206 and channel estimation field 208 are known sequences. For example, in the standard for wireless transmissions at 60 GHz-IEEE 802.11ad (802.11ad), the short training field and channel estimation field are made up of Golay sequences that are mathematical constructs that have known properties. Payload 210 contains header 212 and data 214. While FIG. 2 depicts short training field 206 and channel estimation field 208, the system for estimating and correcting errors in embodiments similar to FIG. 2 may be applied to any wireless transmission standard that uses known sequences in the preamble. As long as receiver 106 knows what sequence to expect, receiver 106 can estimate offsets based on the differences between the expected data packet and the received data packet.

When receiver 106 first receives sample data packet 202, the received data packet contains the initial uncalculated errors. CFO estimator 110 and SFO estimator 114 initially determine estimates for the CFO error and the SFO error respectively based on the differences between the received sequence in preamble 204 and the expected sequence.

In an embodiment, to efficiently calculate and correct for errors, CFO corrector 112 and SFO corrector 114 make large initial corrections to converge the phases and frequencies of the received data packet with the expected data packet. Thus, during preamble 204 of sample data packet 202 a first error correction comprising corrections made by CFO corrector 112 and SFO corrector 114 runs at a high initial gain. At the high initial gain CFO corrector 112 and SFO corrector 114 are able to make large corrections to the data packet.

Once the phases and frequencies of the received data packet have converged with the expected data packet, only smaller errors remain in the data packet. These errors may occur due to variances in noise, jitter from the transmitter clock, or errors in the initial estimate. Because the remaining errors are small compared to the initial errors, less power is needed to correct for them. Thus, during payload 210 of sample data packet 202, gain selector 124 switches to a smaller gain to correct for the smaller residual errors that remain in sample data packet 202.

Figure 3:
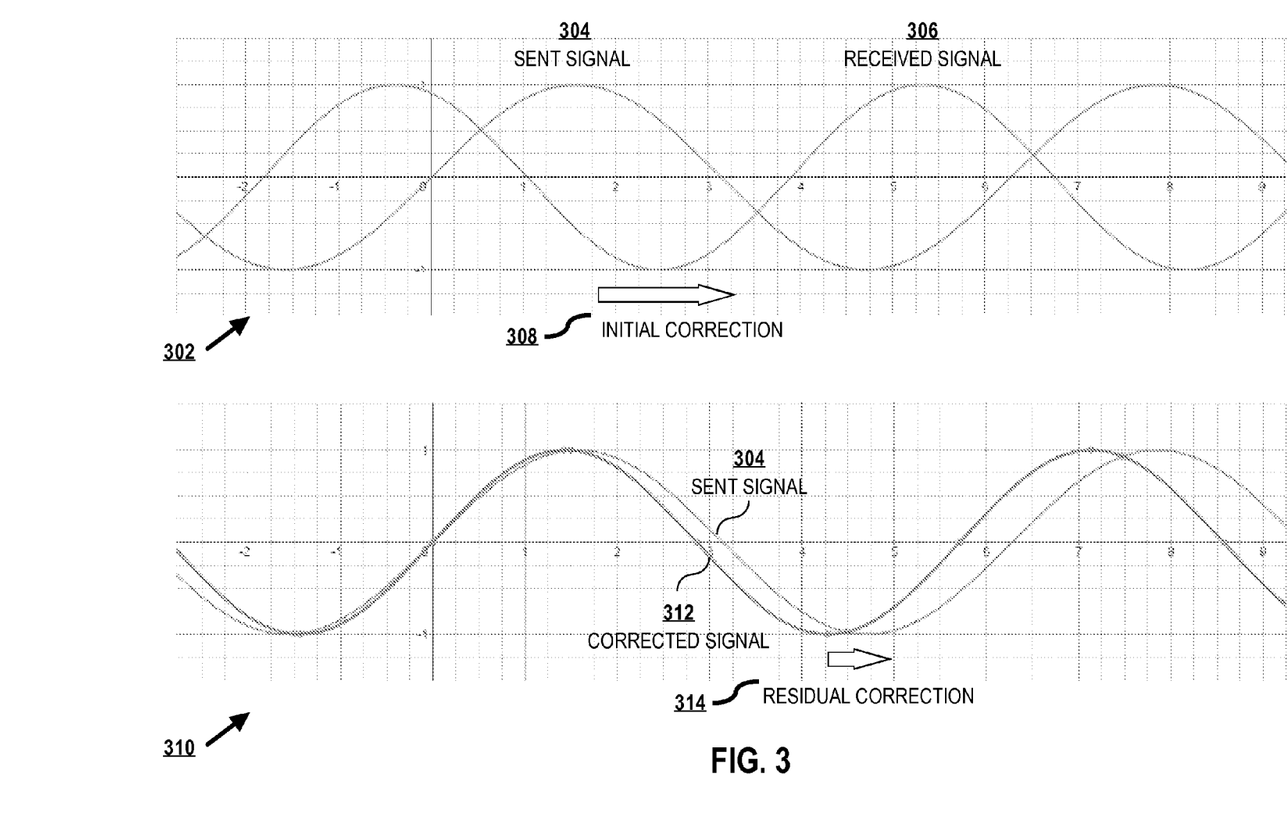
FIG. 3 depicts an example error correction using a high initial gain to make large initial corrections and a smaller gain to make residual corrections.

FIG. 3 depicts an example error correction using a high initial gain to make large initial corrections and a smaller gain to make residual corrections. Signal graph 302 contains sent signal 304 and received signal 306. To correct for the large initial difference between sent signal 304 and received signal 306, receiver 106 uses a large initial gain. The increased power allows CFO corrector 112 and SFO corrector 114 to make large initial correction 308.

Signal graph 310 contains sent signal 304 and corrected signal 312. Corrected signal 312 is initially in the same phase as sent signal 304. Over time, the phases of the two signals begin to deviate either due to noise or jitter in the signal. To compensate for the deviation of the signals, a residual error correction 314 makes smaller changes during the remainder of the data packet. The residual error correction 314 does not use as much power as the initial error correction 308. Thus, gain selector 124 switches to a lower gain for the remainder of the data packet so that the system uses less power.

In an embodiment, both the initial high gain and the remaining lower gain are specified as optimal gains to make corrections of a specific magnitude. For example, the gains may be specified based on repeated testing which shows that a specific high gain converges the phases quickly while not wasting too much power. In other embodiments, the gains used by the system are changeable. Thus, gain selector 124 may determine after receiving multiple data packets that the initial gain is too low and adjust the initial gain accordingly before receiving the next data packet. Conversely, in an embodiment the gains are programmable and gain selector 124 only switches between the programmed high gain and the programmed low gain.

Unique Words

The payload of a data packet often includes unique words separated by the data in the packet. A unique word is a portion of a data packet which occurs at fixed intervals and contains known data. A unique word may be defined by a wireless transmission standard being used in the system. For example, in 802.11ad, the payload of the data packets includes a unique word known as a guard interval (GI) interspersed with data. In 802.11ad, the GI makes up a relatively small percentage of the data transmission. Where each block of data includes 512 symbols, the GI comprises the first 64 symbols. The symbols in the GI are a known sequence which is described in the specification for 802.11ad. Since receiver 106 knows the data to expect during the GI, receiver 106 may use the differences between the expected packet and the received packet during the GIs to estimate the CFO and the SFO.

In FIG. 2, payload 210 is broken up into unique words 216 and data 1-N 218. Each block of data 1-N 218 is preceded by one of unique words 216. Unique words 216 occur at known positions within the packet and contain known sequences. In an embodiment, receiver 106 saves power by not running the error correction during the entire payload of the packet. Instead, receiver 106 runs error corrections only during the unique words of the packet. As the unique words are known sequences, receiver 106 is able to more efficiently estimate offsets during unique words 216 than during the longer portions of data 1-N 218.

In an embodiment, receiver 106 further saves power by combining the use of varying gains with error corrections that only run during the unique words of a data packet. Returning to FIG. 3, a large initial gain allows receiver 106 to make large initial error correction 308. In signal graph 310, the phases of sent signal 304 and corrected signal 312 deviate slowly over time. Instead of constantly running error corrections during the packet, receiver 106 only runs the error corrections at low gain during the unique words. As the deviation between sent signal 310 and corrected signal 312 occurs slowly over time, residual error correction 314 may run periodically during unique words while maintaining a steady signal.

Unlocked Estimates

Figure 4:
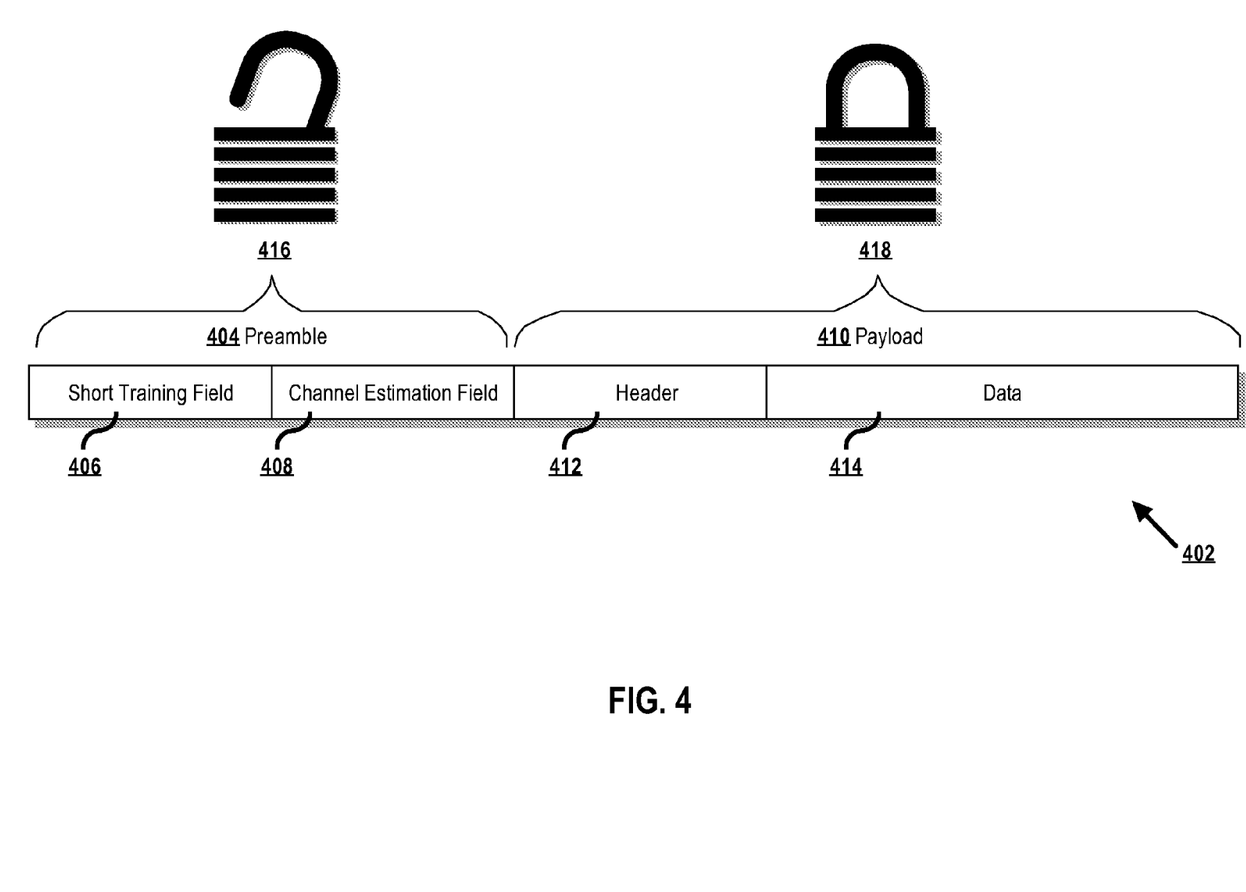
FIG. 4 depicts a sample system for estimating and correcting errors in a sample data packet.

In an embodiment, both the SFO and CFO are originally estimated independently during the preamble of the data packet. FIG. 4 depicts a sample system for estimating and correcting errors in a sample data packet. Sample data packet 402 contains preamble 404 and payload 410. Preamble 404 contains short training field 406 and channel estimation field 408. Short training field 406 and channel estimation field 408 are known sequences. Payload 410 contains header 412 and data 414.

During preamble 404 of the transmitted data, receiver 106 runs CFO estimator 110 and SFO estimator 114 independently. Additionally, receiver 106 runs CFO corrector 112 and SFO corrector 116 independently during preamble 404. In an embodiment, CFO estimator 110 and CFO corrector 112 run as part of a CFO feedback loop while SFO estimator 112 and SFO corrector 116 run as part of an SFO feedback loop. Because short training field 406 and channel estimation field 408 are known sequences, CFO estimator 110 and SFO estimator 114 can use the data received during both sequences to estimate errors. Running both error estimators and error correctors independently is referred to as unlocked mode 416.

In an embodiment, while receiver 106 is running in unlocked mode 416, CFO-SFO phase shift calculator 122 estimates the phase shift between the CFO and the SFO. While the correlation between the CFO and SFO is known in advance, an unknown phase shift exists between the CFO and SFO in each data transmission. In mathematical terms, the CFO is equivalent to the product of a known quantity and the SFO, plus an unknown error. The unknown error is often referred to as the phase shift or phase shift between the CFO and the SFO. In order to accurately estimate one offset using the other, CFO-SFO phase shift calculator 122 determines an estimate for the phase shift.

During unlocked mode 416, CFO-SFO phase shift calculator 122 estimates the phase shift using the known correlation and the estimates of the CFO and SFO determined by CFO estimator 110 and SFO estimator 114. CFO-SFO phase shift calculator 122 estimates the unknown error by determining the difference between the estimated CFO and the known quantity times the SFO. In some embodiments, CFO-SFO phase shift calculator 122 uses multiple estimates of the CFO and the SFO to increase the precision of the estimate of the error. For example, CFO-SFO phase shift calculator may use the mean of multiple estimates of the error to increase the precision of the estimate of the error. Alternatively, if the error is more complex than a constant offset, such as an offset that changes over time, CFO-SFO phase shift calculator may make multiple estimates to determine the more complex error.

Locked Estimates

In an embodiment, receiver 106 switches to a locked mode 418 after the unknown error is determined. In locked mode 418, receiver 106 only estimates one offset. In an embodiment of locked mode 418 only one feedback loop runs to estimate and correct for errors in the packet. Using the phase shift that is estimated during locked mode 418, the correlation between the offsets, and the estimated error in the correlation, total error estimator 118 estimates the second offset based on the first. In summary, during unlocked mode 416 receiver 106 estimates and corrects for both the CFO error and the SFO error using CFO and SFO feedback loops. During locked mode 418, receiver 106 only runs one feedback loop. For example, receiver 106 may choose to only run CFO estimator 110 during locked mode 418. Total error calculator 120 uses the estimates of the CFO along with the phase shift between the CFO and the SFO estimated by CFO-SFO phase shift calculator 122 to estimate the SFO. Then, using the CFO and estimated SFO, total error estimator 118 determines a total error. Using the total error, total error corrector 120 makes corrections to the data packet. In an alternate example, the SFO may be estimated during locked mode 418 and total error estimator 118 may use the estimate of the SFO to estimate the CFO.

In some embodiments, during locked mode 418, receiver 106 estimates the offset that requires the least amount of power to accurately estimate. In other embodiments, receiver 106 runs the error estimator during locked mode 418 that offers the greatest precision. For example, the CFO may require less power to estimate, but the calculation of the SFO based on the CFO may be less accurate than the calculation of the CFO based on the SFO. Alternatively, the CFO may require less power to estimate, but the estimation of the CFO may be less accurate using the CFO feedback loop than the estimate of the SFO using the SFO feedback loop. In some embodiments, receiver 106 would run CFO estimator 110 during locked mode 418 to reduce the amount of power required. In other embodiments, receiver 106 would run SFO estimator 112 during locked mode 418 to increase the precision of the estimates of error.

Figure 5:
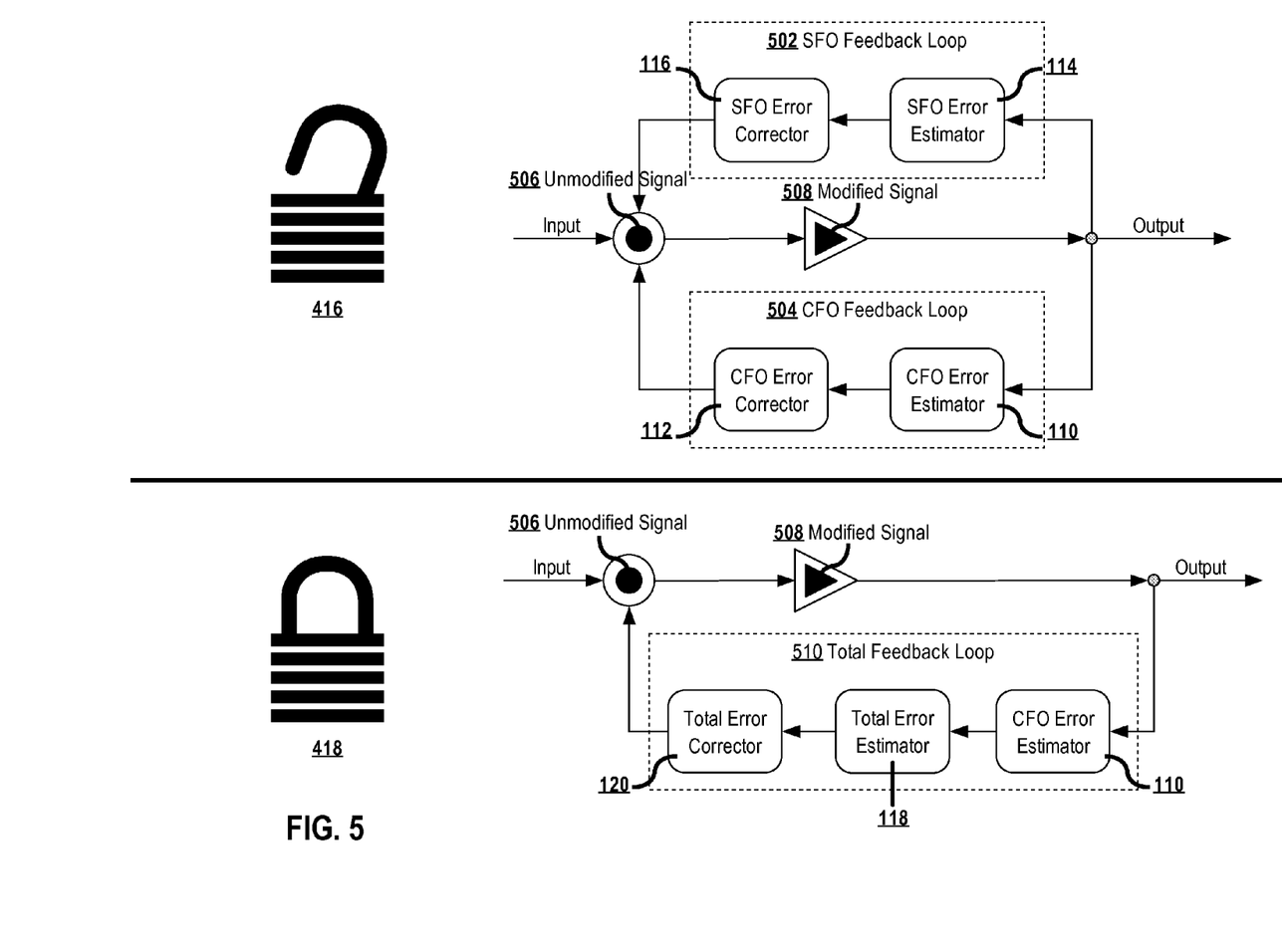
FIG. 5 is a block diagram that depicts example embodiments of unlocked and locked modes.

FIG. 5 is a block diagram that depicts example embodiments of unlocked and locked modes. Unlocked mode 416 contains SFO feedback loop 502 and CFO feedback loop 504. SFO feedback loop 502 contains SFO error estimator 114 and SFO error calculator 116. CFO feedback loop 504 contains CFO error estimator 110 and CFO error calculator 112. In unlocked mode, unmodified signal 506 is received as input. Before output, SFO feedback loop 501 and CFO feedback loop 504 run independently to estimate and correct for the SFO and CFO errors respectively. After SFO feedback loop 502 and CFO feedback loop 504 have made the corrections, modified signal 508 is sent to output.

Locked mode 418 only contains one feedback loop according to the embodiment in FIG. 5. Total feedback loop 510 contains CFO error estimator 110, total error estimator 118, and total error corrector 120. Total feedback loop 510 receives unmodified signal 506 as input. CFO error estimator 110 estimates the CFO error using unmodified signal 506. Total error estimator 118 uses the estimate received from SFO error estimator 110 and the calculated phase shift between the CFO error and the SFO error to estimate a total error. Total error corrector 120 then makes corrections to unmodified signal 506. Modified signal 508 is then sent to output. While CFO error estimator 110 is shown in FIG. 5, in alternate embodiments SFO error estimator 114 is used to drive the total error correction.

In the embodiment depicted in FIG. 4, unlocked mode 416 lasts for the entirety of preamble 404. In an alternate embodiment, unlocked mode only lasts for long enough for CFO-SFO phase shift calculator 122 to determine an estimate for the phase shift between the CFO and the SFO. Once CFO-SFO phase shift calculator 120 determines the phase shift, receiver 106 enters locked mode 418. If CFO-SFO phase shift calculator 120 determines the phase shift before the end of preamble 404, receiver 106 will enter locked mode 418 for the remainder of preamble 404. If CFO-SFO phase shift calculator 120 is unable to determine the phase shift by the end of preamble 404, receiver 106 will run in unlocked mode 416 during payload 410 until CFO-SFO phase shift calculator 120 is able to determine the phase shift.

In another embodiment, receiver 106 remains in locked mode until the estimate of the phase shift reaches a specific point of precision. For example, CFO-SFO phase shift calculator 120's estimation of the phase shift between the CFO and the SFO contains an error. The error in the estimation may be minimized through additional measurements and estimations. Receiver 106 may be configured to continue estimating the phase shift between the CFO and the SFO until the error is minimized past a specified point. Alternatively, according to an embodiment, receiver 106 is configured to remain in locked mode until CFO error corrector 112 and SFO error corrector 116 complete the initial error corrections.

In order to further save power, an embodiment includes a combination of the use of varying gains during the packet with the use of locked and unlocked estimates. In one embodiment, the high gains correlate to unlocked mode 416 while the low gains correlate to locked mode 418. For example, if unlocked mode 416 lasts for only the preamble, then gain selector 124 would switch to the lower gain after the preamble. Alternatively, if unlocked mode continues during the payload of the data packet in order to increase the precision of the estimate of the phase shift between the CFO and the SFO, then gain selector 124 would continue using the high initial gain until receiver 106 enters locked mode 418. In another embodiment, gain selector switches gains independent of the switch from unlocked mode 416 to locked mode 418. For example, gain selector 124 may be configured to only switch to the lower gain after CFO error corrector 112 and SFO error corrector 116 have made the initial large correction to the data packet. In contrast, receiver 106 may be configured to switch from unlocked mode 416 to locked mode 418 at the end of the preamble. Thus, if CFO error corrector 112 and SFO error corrector 116 make the initial large correction before the end of the preamble, gain selector 124 may switch from the high gain to the lower gain while receiver 106 remains in unlocked mode.

In an additional embodiment, receiver 106 further saves power by running the error estimators in locked mode 418 only during the unique words of the payload of the data packet. For example, CFO error estimator 110 may estimate the CFO error during unique words 216 of the packet and total error estimator 118 may estimate the SFO based on the estimate of the CFO during unique words 216.

In additional embodiments all three methods for saving power discussed above, switching gains, estimating only during unique words, and switching between locked and unlocked modes, are used to save power. The three methods may be used independently of each other, dependent on each other, or any combination of the two. For example, gain selector 124 may switch to a low gain at the end of the preamble to coincide with the measurements only during unique words while receiver 106 may switch from unlocked mode to locked mode based on different logic.

Soft Locked Estimates

In an embodiment receiver 106 runs error corrections in soft locked mode during payload 410. In soft locked mode, CFO error estimator 110 and SFO error estimator 114 individually estimate the CFO error and the SFO error respectively. As with locked mode 418, total error estimator 118 uses one of the two estimates and the estimate of the phase shift between the CFO and the SFO to derive the total error. Total error estimator 118 then uses the second estimate to make residual corrections. In an embodiment, during soft locked mode, total error estimator 118 bases the derivation of the estimate of the total error on the CFO estimation and the estimated phase shift between the CFO and the SFO. Total error estimator 216 then uses the estimated SFO error to make small corrections to the derivation. For example, if the estimates of the SFO made by SFO error estimator 114 are consistently a specific amount greater than the estimates of the SFO made by total error estimator 216, then total error estimator 216 may increase its estimates of the SFO, for example, by the specific amount. Alternatively, total error corrector may use the estimated SFO error to make residual corrections to the data packet after making corrections based on the estimated total error.

In an embodiment, CFO-SFO phase shift calculator 222 uses the estimations of the SFO during the payload to update the phase shift between the CFO and the SFO. If the CFO and the SFO shift at different speeds, the phase shift between the two will change during the payload of the packet. By calculating estimates for the SFO during the payload of the packet, receiver 106 can recalculate the phase shift between the CFO and the SFO to minimize the error. Alternatively, using multiple estimates of the phase shift between the CFO and SFO over time, CFO-SFO phase shift calculator 222 may estimate the rate of change of the phase shift over time. Total error calculator 218 may then use the time-dependent phase shift when estimating the total error.

Figure 6:
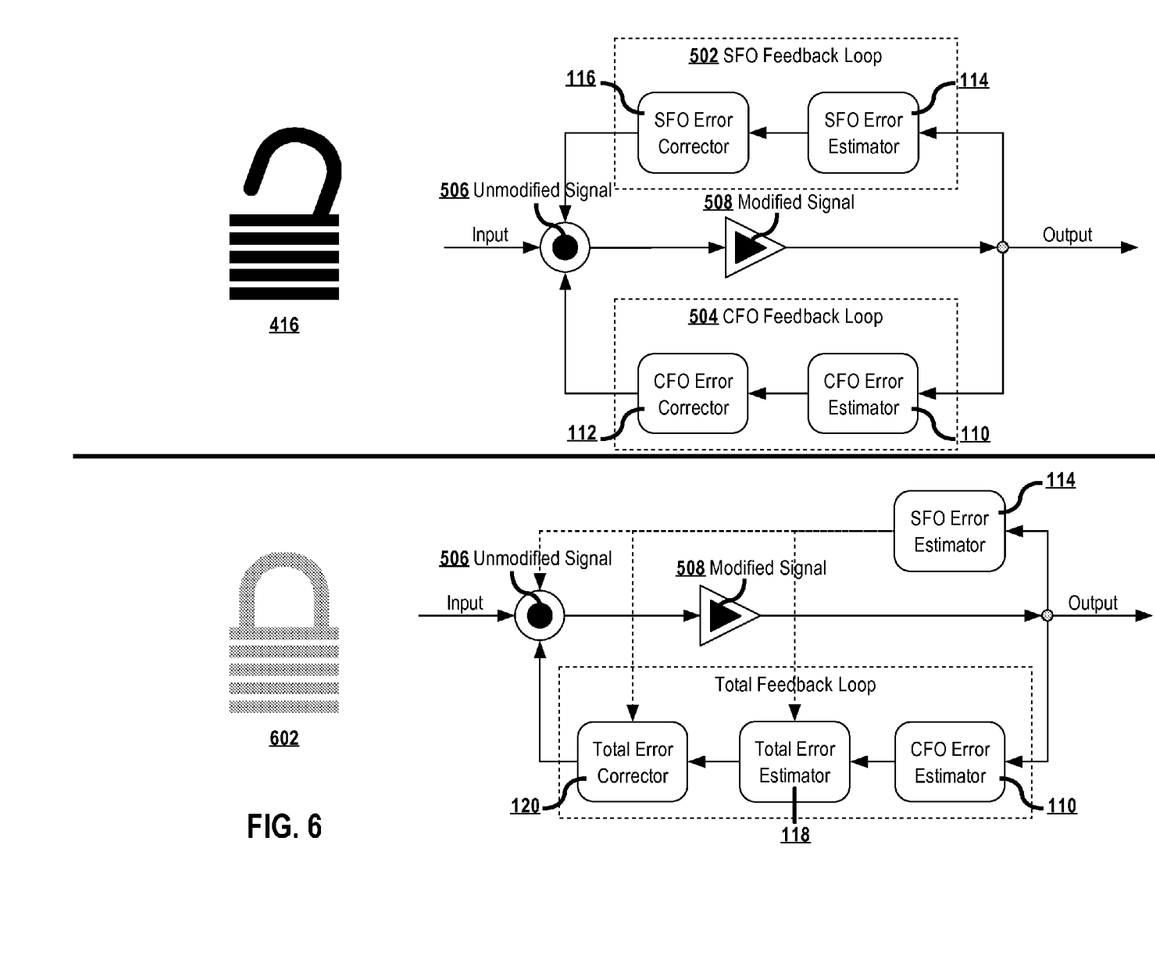
FIG. 6 is a block diagram that depicts example embodiments of unlocked and soft locked modes.

FIG. 6 is a block diagram that depicts example embodiments of unlocked and soft locked modes. Unlocked mode 416 contains SFO feedback loop 502 and CFO feedback loop 504. SFO feedback loop 502 contains SFO error estimator 114 and SFO error calculator 116. CFO feedback loop 504 contains CFO error estimator 110 and CFO error calculator 112. In unlocked mode, unmodified signal 506 is received as input. Before output, SFO feedback loop 502 and CFO feedback loop 504 run independently to estimate and correct for the SFO and CFO errors respectively. After SFO feedback loop 502 and CFO feedback loop 504 have made the corrections, modified signal 508 is sent to output.

Soft locked mode 602 contains total feedback loop 510. Total feedback loop 510 works similarly in soft locked mode 602 as in locked mode 418. CFO error estimator 110 estimates the CFO error, total error estimator 118 uses the estimated CFO error and the phase shift between the CFO error and the SFO error to derive an estimate of the total error, and total error corrector 120 makes corrections to unmodified signal 506. Additionally, SFO error estimator 114 creates estimates of the SFO error. Instead of making corrections based on the estimates, SFO error estimator 114 works with total feedback loop 510 to increase the precision of the modifications.

SFO error estimator 114 can increase the precision of total feedback loop 510 in multiple ways. In one embodiment, SFO error estimator 114 sends the estimates of the SFO error to total error estimator 118. Total error estimator 118 uses the estimates of the SFO error to modify the equation used to derive the total error. In another embodiment, SFO error estimator 114 sends the estimates of the SFO error to total error corrector 120. Total error corrector 120 uses the estimates of the SFO error to drive additional corrections to unmodified signal 506. For example, total error corrector 120 may determine, based off the estimates of the SFO error made by SFO error estimation 114, that total error estimator 118's estimate of the SFO was low by a specific amount. Total error corrector 120 may then execute additional corrections on unmodified signal 506.

In an alternate embodiment, SFO error estimator 114 uses the estimates of the SFO error to create residual corrections to unmodified signal 506. For example, SFO error estimator 114 may determine that the SFO error has shifted slightly over time while the CFO error has either not shifted, or shifted at a different pace. SFO error estimator 114 may then use the difference between the expected SFO error and the estimated SFO error to make residual corrections to the data packet.

While FIG. 6 depicts CFO error estimator 110 in total feedback loop 510, in other embodiments SFO error estimator 114 is part of total feedback loop 510 while CFO error estimator 110 runs independently. In other embodiments, both CFO error estimator 110 and SFO estimator 114 run as part of total feedback loop 510. In further embodiments, a second feedback loop runs at a lower gain or a lower frequency to make residual corrections while total feedback loop 510 makes the majority of the corrections.

In an embodiment, the soft locked mode saves power over a fully unlocked mode by only making corrections using one feedback loop. In a fully unlocked mode, both feedback loops run separately, create separate estimations, and make separate corrections to the received data packet. In soft locked mode, both feedback loops create estimations, but only one feedback loop makes alterations to the packet. Alternatively, in soft locked mode, both feedback loops create estimates, but only one feedback loop is used to make the bulk of the corrections to the data packet. The second feedback loop only makes residual corrections if there are any residual corrections to make.

Additionally, in an embodiment receiver 106 saves additional power by only making estimates for one of the offsets during the unique words of the data packet. For example, CFO error estimator 110 and CFO error corrector 112 run during the entire payload of the data packet, creating estimates and making corrections to the data packet. SFO error estimator 114, on the other hand, only runs during the unique words of the payload. While the CFO feedback loop still drives the corrections to the data packet, the SFO feedback loop may make residual corrections during the unique words of the data packet. Alternatively, the SFO feedback loop may only estimate the SFO during the unique words to be used in making corrections to the phase shift between the CFO and the SFO.

As with locked mode 418, in some embodiments soft locked mode 602 is combined with one or more of the other power saving features discussed above. For example, gain selector 124 may switch to a lower gain during soft locked mode. As another example, both CFO error estimator 110 and SFO error estimator 114 may be configured to only create estimates during the unique words of the data packet instead of one estimate running for the entirety of the data packet while the other only runs during unique words. In another embodiment, receiver 106 switches between locked mode 418 and soft locked mode 602 during the payload of the data packet. For example, receiver 106 may be configured to run soft locked mode 602 during the initial portion of the payload in order to create a more precise estimate of the phase shift between the CFO error and the SFO error. Receiver 602 may then switch to locked mode after a predetermined period of time or after receiver 602 determines that the phase shift between the CFO error and the SFO error has reached a specific level of precision.

Using Information from the Header

In an embodiment, receiver 106 is configured to determine whether to focus on power reduction or precision based on information in header 412 of the data packet. For example, header 412 may include information about the type of modulation used for the data packet. If a complex type of modulation is used, receiver 106 may be configured to focus on precision. In order to increase precision, receiver 106 may run in unlocked mode 416 longer to reduce the error in the estimate of the phase shift between the CFO and the SFO. Additionally, during locked mode receiver 106 may choose to measure the offset that grants the greatest precision. If receiver 106 determines, based on information in header 412, to focus on power reduction, receiver 106 may only remain in unlocked mode 416 only until the phase shift between the CFO and the SFO is measured. Additionally, during locked mode receiver 106 may choose to estimate the offset which requires the least amount of power.

In an embodiment, gain selector 124 is configured to alter the gain used during the payload of the packet based on information received from the header. For example, if header 212 specifies a need for precision over power reduction, gain selector 124 may use the initial high gain during the payload of the packet to create more precise error corrections. In addition, the instructions in the header 212 may cause receiver 106 to run the error corrections during the entirety of the payload instead of only during the unique words.

In an embodiment, receiver 106 is configured to use unlocked mode during the payload for maximum precision, locked mode during the payload for maximum power reduction, soft locked mode for a mixture of precision and power reduction, or any combination of the three. Additionally, receiver 106 may be configured to determine whether soft locked mode creates residual corrections or is used to estimate the phase shift between the CFO and the SFO based on which method creates better accuracy or uses less power.

Implementation Examples

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
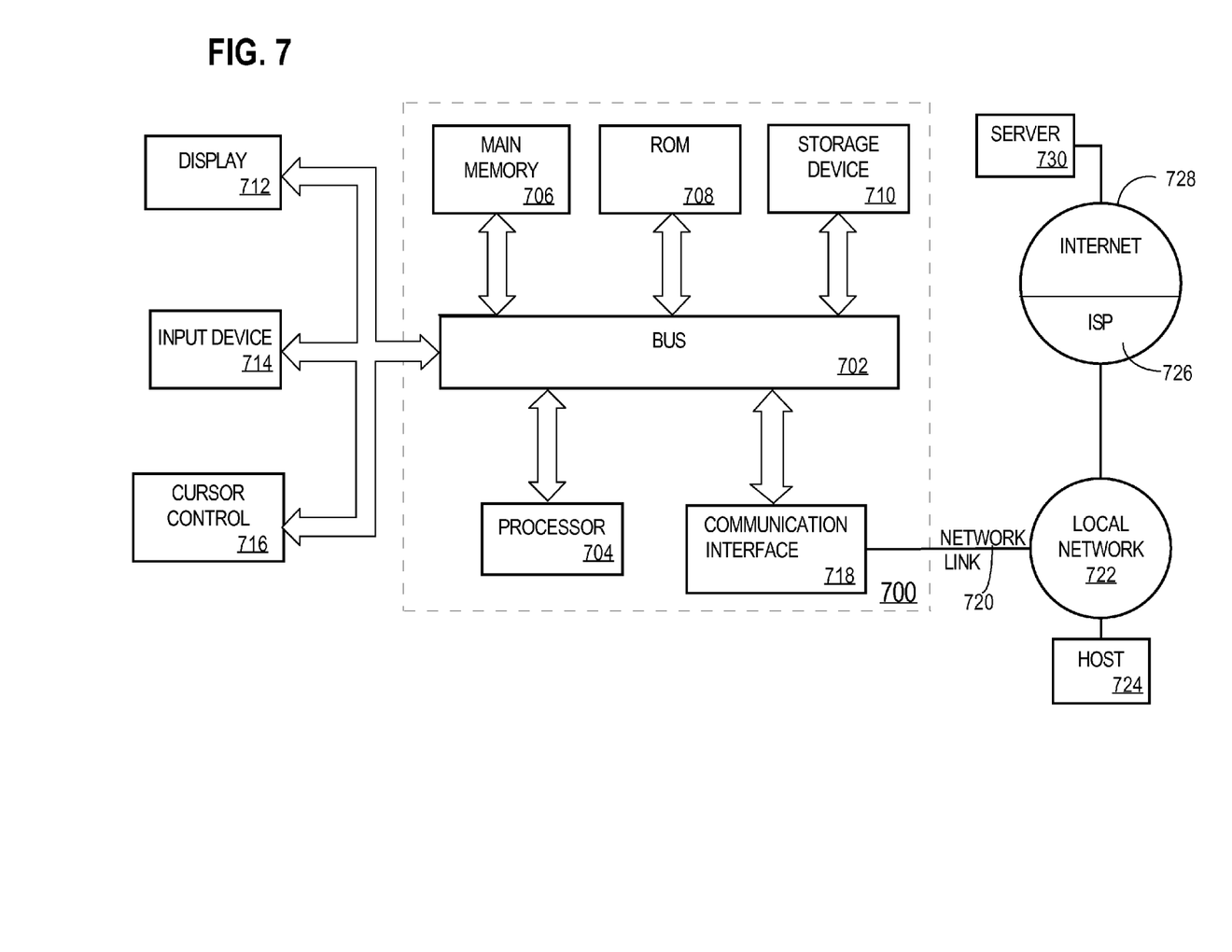
FIG. 7 is a block diagram that depicts a computer system upon which embodiments may be implemented.

For example, FIG. 7 is a block diagram that depicts a computer system 700 upon which an embodiment may be implemented. Computer system 700 may be any computing device capable of transmitting and receiving information and performing the functions described herein, including, but not limited to, a smart phone, PDA, tablet, computing device, laptop computer, desktop computer, work station, or radio receiver.

Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A radio frequency signal receiver, comprising:
   one or more receiver clocks;
   a first error estimator, configured to estimate a carrier frequency offset error for a received data packet during a first portion of the received data packet;
   a first error corrector, configured to correct for the carrier frequency offset error in the received data packet;
   a second error estimator, configured to estimate a sampling frequency offset error for the received data packet during the first portion of the received data packet;
   a second error corrector, configured to correct for the sampling frequency offset error in the received data packet;
   a phase shift calculator, configured to determine initial phases of the carrier frequency offset error and the sampling frequency offset error;
   wherein one or more of the first error estimator and the second error estimator are further configured to operate during a second portion of the received data packet and estimate one or more components of a total timing error in the received data;
   an error calculator, configured to determine an estimate of the total timing error based on the initial phases of the carrier frequency offset error, the initial phases of the sampling frequency offset error and the one or more components of the total timing error; and
   a third error corrector, configured to correct for the total timing error in the received data packet.

2. The radio signal frequency receiver of claim 1, wherein the first portion of the received data packet is the preamble of the received data packet and the second portion of the received data packet is the payload of the received data packet.

3. The radio signal frequency receiver of claim 1, wherein:
   the one or more components of the total timing error in the received data packet consists of the carrier frequency offset error; and
   the error calculator calculates the total timing error by:
      estimating the sampling frequency offset error based on its relationship to the carrier frequency offset error; and
      combining the estimated carrier frequency offset error with the estimated sampling frequency offset error.

4. The radio signal frequency receiver of claim 1, wherein:
   the one or more components of the total timing error in the received data packet consists of the sampling frequency offset error; and
   the error calculator calculates the total timing error by:
      estimating the carrier frequency offset error based on its relationship to the sampling frequency offset error; and
      combining the estimated sampling frequency offset error with the estimated carrier frequency offset error.

5. The radio signal frequency receiver of claim 1, wherein:
   the one or more components of the total timing error in the received data packet comprises the carrier frequency offset error and the sampling frequency offset error;
   the first error estimator is configured to estimate the carrier frequency offset error at a first rate and the second error estimator is configured to estimate the sampling frequency offset error at a second rate;
   wherein the first rate is greater than the second rate;
   the error calculator determines the estimate of the total timing error in the received data packet by:
      estimating the sampling frequency offset error based on its relationship to the carrier frequency offset error;
      making corrections to the estimated sampling frequency offset error using the estimated sampling frequency offset error; and
      combining the estimated carrier frequency offset error with the corrected sampling frequency offset error.

6. The radio signal frequency receiver of claim 1:
wherein the second portion of the received data packet begins immediately after the phase shift calculator determines the initial phases of the carrier frequency offset error and the sampling frequency offset error.

7. The radio signal frequency receiver of claim 1, wherein the one or more of the first error estimator and the second error estimator are further configured to operate only during one or more known portions of the second portion of the received data packet.

8. The radio signal frequency receiver of claim 1, further comprising a gain selector, configured to cause the radio frequency signal receiver to use a first gain during the first portion of the received data packet and use a second gain during the second portion of the received data packet;
wherein the first gain is greater than the second gain.

* * * * *